United States Patent [19]

Lefkowitz et al.

[11] 4,113,535
[45] Sep. 12, 1978

[54] HIGH TEMPERATURE FILTER FABRICS

[75] Inventors: Leonard R. Lefkowitz, Latham; W. Henrik Krohn, Chatham, both of N.Y.

[73] Assignee: Huyck Corporation, Wake Forest, N.C.

[21] Appl. No.: 832,316

[22] Filed: Sep. 12, 1977

Related U.S. Application Data

[62] Division of Ser. No. 680,602, Apr. 27, 1976, Pat. No. 4,070,519.

[51] Int. Cl.² ............................................. B32B 5/06
[52] U.S. Cl. .................................. 156/148; 156/62.6; 428/234; 428/235
[58] Field of Search ............... 428/234, 235, 300, 280; 156/148, 62.6

[56] References Cited

U.S. PATENT DOCUMENTS 3,356,561  12/1967  Squire et al. ..................... 428/234

Primary Examiner—James J. Bell
Attorney, Agent, or Firm—Sanford S. Wadler

[57] ABSTRACT

Generally, the present invention relates to a resin-treated filter fabric which comprises a surface or batt layer comprised of glass fibers which is joined, by needling, to an underlayer which is comprised of mineral fibers. The present invention includes within its scope a method of manufacturing such a filter fabric.

11 Claims, 2 Drawing Figures

HIGH TEMPERATURE FILTER FABRICS

This is a division of application Ser. No. 680,602 filed Apr. 27, 1976 now U.S. Pat. No. 4,070,519.

BACKGROUND OF THE INVENTION

In the area of filter media technology, needle-felted filter fabrics have long been used because of the numerous advantages which they offer. One of these advantages is that, since it is possible to have a random arrangement of fibers in a needle-felted structure, there is an extremely large number of pores available for filtration. Further, such a structure allows a large fiber surface area to occupy a relatively small area of fabric. In addition, it is relatively easy to produce needle-felted filter media which have excellent pore size uniformity as well as desirable dimensional stability.

Due to the aforementioned characteristics, presently there are available large numbers of needle-felted filter media which meet a large number of diverse applications. For example, when filtering temperatures do not exceed 215° Fahrenheit, wool felts can be used to filter gases and the like. If filtration is to be done at moderate temperatures up to 270° Fahrenheit, felted filter fabrics can be made from needling acrylic fibers. Filter fabrics having higher temperature resistance are known; such fabrics usually incorporate a mixture of various mineral and/or synthetic fibers. In this connection, reference is made to German Pat. No. 2,232,785 which relates to a needle-felted filter fabric utilizing an asbestos/glass fiber mixture in the batt layer and a mineral fiber base layer. However, such materials are believed to have poor reproducibility due to the difficulties involved in controlling the pore size uniformity of the glass/asbestos mixture during the needling and resin-treating processes involved in making such filter fabrics. Further, such an asbestos/glass mixture in a filter fabric is thought to present potential health hazards, as asbestos fibers may be released into the environment during the production of such filters.

Another material which has been found useful in high-temperature filtration is polytetrafluoroethylene; however, it is not suitable for all filtering applications due to its high cost and lack of dimensional stability at elevated temperatures.

Glass fibers are known to be resistant to most corrosive environments and to possess dimensional stability at elevated temperatures. These properties have permitted glass fibers to be incorporated into a wide variety of filtering media. In this connection, reference is made to Silverman, et al. U.S. Pat. No. 2,758,671; Dennis, U.S. Pat. No. 3,262,578; Kinsley, U.S. Pat. No. 3,920,428; and Taylor, U.S. Pat. No. 3,061,107. However, all of the aforementioned patents are nonneedle felted structures; and hence, up to the present it has not to our knowledge been possible to produce a needle-felted filter fabric comprised of an all glass fiber batt or surface layer and a mineral fiber base or underlayer. Such a structure has long been desired since it would offer the advantages of both needle-felted filters and glass fibers.

Glass fibers that are embodied in a structure as described herein possess a number of excellent properties which make them desirable for a filtration material. For example, it is known that glass fibers are relatively inert and, therefore, are resistant to alkali as well as most acid solutions. Also, glass fibers are stable over a wide range of temperature and humidity conditions. Further, glass fibers can be produced in a wide variety of fiber diameters and such fibers have a low moisture absorption as well as high strength at elevated temperatures. A high-temperature filter fabric comprised of an all glass fiber batt and mineral fiber base layer as described in the present invention, enables users of such needle-felted fabrics to reduce the cooling requirements of the auxiliary devices heretofore needed for lowering the temperature of unfiltered gases. These properties make glass fibers an ideal material for filtering, particularly at high temperatures or in most corrosive environments. However, until the advent of the present invention, it was not thought possible to needle glass fibers onto a substrate so as to produce a needle-felted filter fabric construction having the strength and durability needed in many industrial applications. We believe that prior art attempts to produce such a structure have failed due to the high breakage of the glass fibers in the batt whenever needling has been attempted. It is thought that the reason why previous attempts to produce needle-felted filter fabrics having glass fiber batts have failed is due to the well-known fact that, in needling glass fiber batts, the brittleness of the glass fibers having relatively large fiber diameters causes the disintegration of the fibers to such an extent that the resulting product is rendered unusable as a filter for many commercial applications.

We have found that by needling glass fibers having a diameter of from 2 to 8 microns onto a mineral fabric substrate and using a suitable resin-binder, it is possible to produce a needle-felted filter fabric which can filter gases continuously at temperatures as high as at least about 500° Fahrenheit and intermittently at higher temperatures.

Accordingly, it is an object of the present invention to make a resin-impregnated needle-felted filter fabric which comprises a surface or batt layer comprised of glass fibers and an underlayer which is comprised of mineral fibers.

It is also an object of the present invention to make a needle-felted filter fabric which is capable of removing particles from gases at elevated temperatures.

It is another object of the present invention to make a needle-felted filter fabric having high tensile strength as well as dimensional stability at elevated temperatures.

It is a further object of the present invention to make a needle-felted filter fabric which is economical to produce as well as relatively long-lasting.

It is a still further object of the present invention to make a needle-felted filter fabric having low moisture absorption as well as resistance to most corrosive environments.

It is a still further objective of the present invention to provide a method for needling glass fibers onto a mineral fiber base layer.

Another object of the present invention is to provide a needle-felted filter fabric having a large number of pores within a relatively small area.

A further object of the present invention is to provide a needle-felted filter fabric having relatively uniform pore dimensions.

A still further object of the present invention is to provide a needle-felted filter fabric having a high air to cloth ratio.

A still further object of the present invention is to provide a needle-felted filter fabric having desirable particle release properties.

Another object of the present invention is to provide a needle-felted filter fabric having a high filtering efficiency.

SUMMARY OF THE INVENTION

These and other objects, as will be apparent to those skilled in the art, may be achieved from the practice of the present invention, one embodiment of which is the forming of a nonwoven glass fiber batt or surface layer which is then joined by needling and resin-treatments to a woven asbestos base layer. One embodiment of the method of the present invention comprises the steps of producing a filter fabric having a fibrous batt or surface layer, wherein the surface or batt layer is comprised of glass fibers and is formed by carding or air laying or other suitable methods, and which is then joined by needling to the top side of a woven base or under layer. Resin composites or resins such as silicone-based resins and the like, are then added to the structure prior to needling or after needling, depending on the end-use and desired properties.

An understanding of this invention may be had from the detailed discussion which follows and from an examination of the drawings shown herein.

DESCRIPTION OF THE PREFERRED EMBODIMENTS

Figure 1:
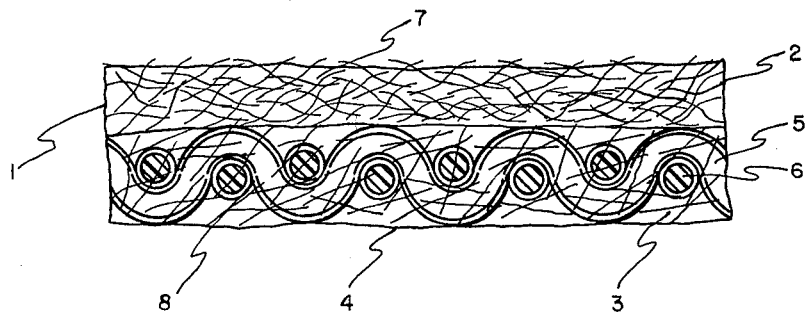
FIG. 1 is a cross-section or representation of one embodiment of this invention.
Figure 2:
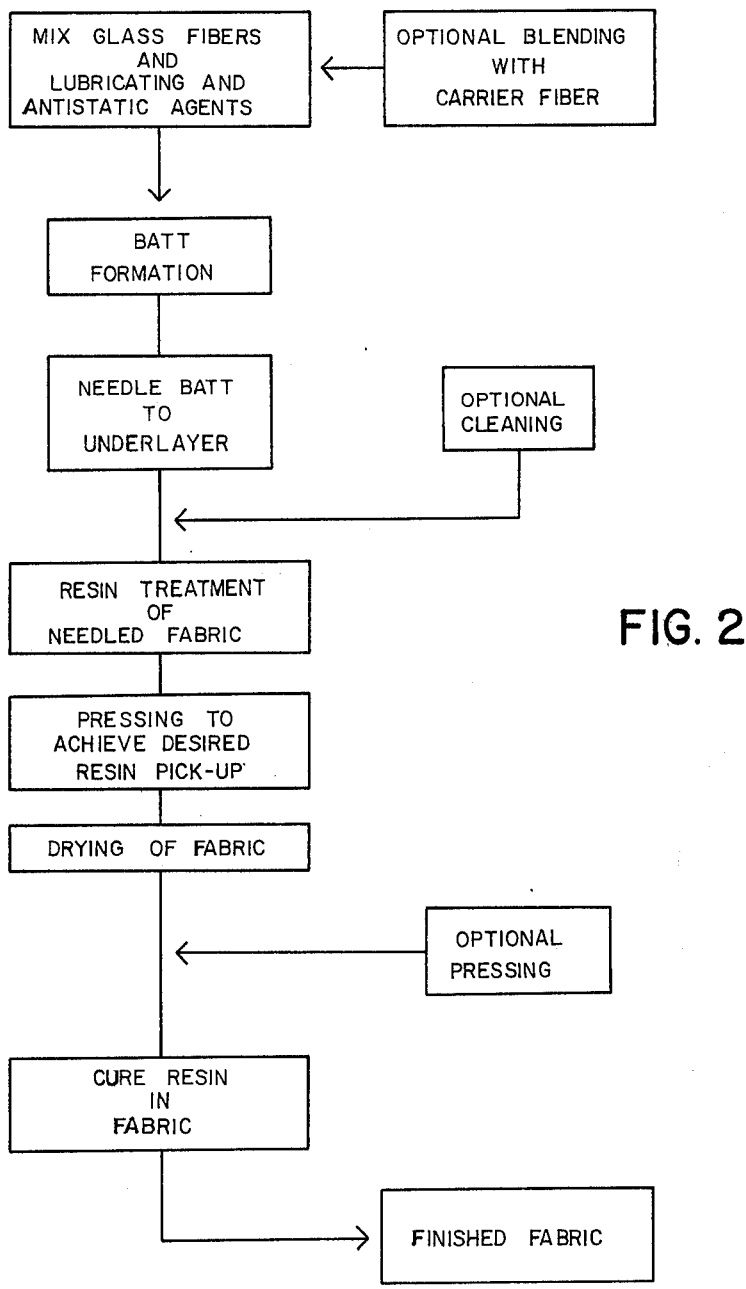
FIG. 2 is a schematic description of a method for manufacturing needle-felted filter fabrics which embody the present invention.

Illustrated in FIGS. 1 and 2 is the preferred embodiment of the present invention. Illustrated in FIG. 1 is a needle-felted filter fabric 1 made in accordance with the present invention which comprises a batt or surface layer 2 and a base or underlayer 3.

Underlayer 3 shown in FIG. 1 is of an open-mesh woven construction. The underlayer 3 is a plain weave having warp yarns 5 and weft yarns 6. A variety of weave patterns may be used such as a plain, twill, satin, or any other similar weave; the choice of weave being dependent on the fluid flow characteristics desired. For some applications, it may be desirable to have base or underlayer 3 constructed as a knitted or nonwoven structure.

The underlayer may be made out of any mineral fiber having the necessary properties of structural integrity, and chemical and temperature resistance required for an end-use application. The preferred ratio of batt fibers to base layer fibers by weight is about 1:1.5. However, other weight ratios may be used depending on the end-use application. A mineral fiber which has been found particularly useful in making the base or underlayer of the present invention is asbestos which is used in the form of a yarn structure which is then woven to make the base layer 3. One particular type of asbestos yarn which has been found to give excellent results as a base layer is sold under the trademark Novatex ® and is available from Raybestos Manhattan of Bridgeport, Connecticut under fabric style number 12P083N. However, other types of asbestos may also be used in constructing the present invention. In addition, it may be desirable in some applications to wrap the asbestos or other mineral fiber yarns around certain metals so as to provide improved strength and wear-resistance, and then the wrapped asbestos/metal yarn can be woven, knitted or otherwise formed to produce a base or underlayer. If metals are to be used to reinforce the asbestos or other mineral fiber yarn structure, some metals which have been found suitable are monel and stainless steel. For some end-use applications, it may be desirable to resin-coat the fibers before they are formed into yarns. For some end-use applications, it may be desirable to coat the yarns per se. Many compounds and additives are available for the purpose of coating; for example, silicones, polytetrafluoroethylene, polyphenylene sulphide, imides, molybdenum disulphide and graphite could be used by themselves or in mixtures thereof. Other examples of mineral fibers which are suitable for use in constructing the base or underlayer 3 are glass fibers, and ceramic fibers. By way of example, the fibers used can be in the form of continuous filament, spun or bulked fiber structures. The ceramic fibers used can be any of the usual fibers made from various metal oxides. A suitable ceramic fiber which may be used is available under the product name AB-312 from the 3M Company of St. Paul, Minnesota. The above-described examples are given without intending to limit the scope or range of the present invention, since it is believed that other materials may also be suitable.

The surface layer 2 illustrated in FIG. 1 is constructed of glass fibers 7 having a diameter of from 2 to 8 microns. Glass fibers falling within the aforementioned diameter specifications are available under the names Beta fiberglass and E-glass; such products are available from Owens-Corning Fiberglass Corporation of Toledo, Ohio. Basically, these products are glass fibers several times finer than ordinary organic fibers. In general, these fibers will not melt until a temperature of about 1350° Fahrenheit is reached.

It should be noted that the filter fabric depicted in FIG. 1 can be fabricated into a wide variety of shapes to meet diverse end-use applications. For example, if the filter fabric of the present invention is desired to be used in removing solid particulate matter from gas which passes through the cloth, it can be sewn into filter bags which are the usual convenient shape for gas filtration. A filter bag is in most cases a filter fabric which has been shaped in the form of a cylindrical bag or envelope of roughly elliptical cross-sections of the desired size to fit into the particular separation mechanism. Filter fabrics made according to the teachings of the present invention are especially suitable for end-uses in which gases are to be filtered at elevated temperatures above 400° Fahrenheit. Of course, if the filter fabric described herein is to be shaped into a filter bag configuration, it is essential that the batt layer of the fabric be the side coming in contact with the initial or upstream gas flow; and correspondingly, the base layer will be in contact with the gas flow after it contacts the batt layer. It is believed that filter bags constructed of the filter fabric described herein will have a high air-to-cloth ratio due to the large numbers of uniform pores available in the batt or surface layer of the fabric. The term air-to-cloth ratio as used herein is meant to describe the number of cubic feet of a given gas which can be filtered per square foot of fabric area.

In producing structures according to the teachings of the present invention, due to the peculiar properties of glass fibers, it may in some cases be desirable to blend additional staple fibers, referred to herein as carrier fibers, with the glass fibers prior to forming the batt or surface layer. A staple fiber such as regenerated cellulose or various acrylic fibers such as Orlon may be used. It is preferred that such staple fibers comprise approximately 10% of the total weight of the batt layer. Irrespective of whether a carrier fiber has been blended with the glass fibers of the batt, it is essential that a lubricating agent is added and preferable that antistatic agents or compounds be added to reduce the electrostatic and frictional forces generated by the batt-forming and needling processes.

A wide variety of lubricating agents or compounds are available for this purpose; for example, silicones, aromatic and aliphatic polyglycolethers and the like. Also, a wide range of antistatic agents or compounds are available such as polyoxyethylene monostearate and polyoxyethylene monolaureate. One product known to give satisfactory results as a lubricant is sold by Emery Industries of Cincinnati, Ohio, under the trade name Emerstat 7451. An antistatic material available from the same company is sold under the trade name Emerstat 7450.

After the lubricant and antistatic agents have been added, the nonwoven batt is then formed by either carding and cross-laying or air laying, all of which are well-known techniques for batt formation. The recitation of the foregoing techniques is not meant to exclude other methods.

In needling the batt and surface layers together, it is essential that needles be used which minimize the breakage of the relatively brittle glass fibers. In this connection reference is made to Foster, U.S. Pat. No. 3,815,186 which describes a felting needle constructed so as to minimize fiber breakage during needling.

It should be understood that the term needle-felted herein is meant to describe a structure in which the glass fibers of the batt or surface layer are interlocked with each other and with the mineral fibers or yarns of the base or underlayer so as to form a mechanically-bonded structure. As can be seen in FIG. 1, due to the needling process used to join the batt layer 2 and base layer 3 together, a substantial number of the glass batt layer fibers are driven through the underlayer 3 so that glass fiber ends 8 protrude on the bottom side 4 of the underlayer 3.

After needling, it may be advantageous for certain end-use applications to heat the needled felt to a sufficiently high temperature to remove any undesirable finishes or lubricants and carrier fibers present in the needled felt. For most undesirable substances to be removed, a temperature of from 600°–800° Fahrenheit will be sufficient. As an alternative to using heat to remove undesirable materials present in the needle-felted filter fabric after needling, it is also possible to remove most lubricants or finishes present in the needled felt by washing the needle-felted filter fabric in a mild acid solution followed by a rinsing of the fabric and further treatment with an ammonia-alcohol solution. The aforementioned method of rinsing is by example only, and not by way of limitation as it is believed that other well-known methods of cleaning would also be suitable.

After the needle-felted filter fabric has had any undesirable materials removed by heat cleaning or any other suitable method, it is next treated with a suitable resin. A resin treatment is needed to further bind and anchor the surface or batt glass fibers 7 to the underlayer 3. The resin treatment also serves to protect the glass fibers and the base layer from abrasion and corrosion, as well as increasing the particle-release properties of the batt layer. It is preferred that the resin be applied to the needle-felted filter fabric by immersing the fabric in a resin bath so as to assure a resin solids pick-up of from 5 to 40% of the total felt weight; however, the resin may be sprayed on or applied by any other suitable means. Preferred resins are a mixture of tetrafunctional methyl silicones and dimethyl silicone in a 2:1 ratio, both of which are sold under the trade names SR-240 and G-662 by the General Electric Company, Waterford, New York. Other resins which are believed to be suitable are polytetrafluoroethylene polymide compositions. However, any resin having the necessary thermo-oxidative resistance required may be used, and the recitation of specific resins and mixtures thereof is not intended to limit the scope of the present invention. Molybdenum disulphide can be added to the resin mixture if increased lubrication and wear-resistance are desired for a particular end-use. If, in addition to greater wear-resistance and lubrication, it is desirable to have a needle-felted filter fabric which also has less resistance to electrostatic build-up, various carbons or graphites may be also added. After the fabric has been immersed in a resin bath for a sufficient time to saturate the fabric, it is then pressed to give the desired resin pick-up and dried by warm air or using any other suitable means to remove any remaining solvent. Naturally, the use of different resins will require different drying temperatures.

In some cases, especially where a smoother surface is desired to increase the ease of particle-release during the cleaning of the filter, the needle-felted filter fabric will undergo a second pressing process to produce a uniform surface with a desired porosity range. This pressing operation can be carried out by any suitable means and the temperature conditions and pressures applied to the fabric will vary with the resins selected and the pore dimensions which are to be achieved.

After the drying and pressing operations are completed, it may be necessary to cure the resins which have been impregnated into the fabric structure. By impregnation of the fabric structure, it is meant that the resin permeates the fabric structure so as to coat the individual batt fibers; and, as the case may be, the fibers or yarns of the underlayer. Satisfactory curing can be accomplished in most cases by applying heat by the use of air which has been heated to about 400° F., or other suitable means. Naturally, the temperature required and the curing time will be dependent on the amount and type of resin used in impregnating the filter fabric. Also, it is possible to combine the pressing, drying and curing operations in one step through the use of heated press rolls.

FIG. 2 outlines in flow chart form the method(s) disclosed herein of producing the filter fabric of the present invention.

It will be apparent to those skilled in the art, that the present invention may be practiced in a wider variety of embodiments without materially departing from the spirit and scope of this invention. It is also to be understood that in the foregoing specification, specific embodiments and components thereof, have been illustrated and discussed by way of illustration only and not of limitation; and that the invention may be practiced by those skilled in the art utilizing a wide variety of materials and configurations without departing from the true spirit of the invention.

We claim:
1. A method of making a filter fabric comprising the steps of:
   (a) mixing a lubricating agent with glass fibers having a diameter of from 2–8 microns;

(b) forming a non-woven batt layer from said glass fibers;
(c) forming a base layer from mineral fibers;
(d) resin impregnating and needling together said base layer and said batt;
(e) pressing said fabric to a degree sufficient to obtain a predetermined resin solids pickup;
(f) drying said fabric at a temperature sufficient to remove any liquid solvent; and
(g) heating said fabric at a temperature sufficient to cure said resin.

2. A method as described in claim 1 wherein said mixing step includes mixing an antistatic material with said lubricating agent and said glass fibers.

3. A method as described in claim 2 wherein said mixing step includes blending carrier fibers with said lubricating agent, said glass fibers, and said antistatic material.

4. A method as described in claim 1 wherein said mixing step includes blending carrier fibers with said lubricating agent and said glass fibers.

5. A method as described in claim 1 wherein said forming step includes weaving yarns to form a woven base layer.

6. A method as described in claim 1 wherein said batt is formed by carding and cross-lapping.

7. A method as described in claim 1 wherein said batt is formed by air laying.

8. A method as described in claim 1 wherein said resin is cured at from 300° to 400° Fahrenheit.

9. A method as described in claim 1 including the steps of impregnating said batt layer with resin, impregnating said base layer with resin, and then needling together said batt layer and said base layer.

10. A method as described in claim 1 including the step of needling together said batt layer and said base layer and then impregnating the composite structure.

11. A method as described in claim 1 including the step of coating said mineral fibers with resin prior to forming said base layer.

* * * * *